3,428,564
STABLE HIGHLY BASIC DISPERSIONS OF CALCIUM COMPOUNDS IN LIQUID LUBRICATING OILS
Claire Bluestein, Glen Rock, Wilfrid L. Lauze, Rutherford, and Bernard R. Bluestein, Glen Rock, N.J., assignors to Witco Chemical Company, Inc., New York, N.Y., a corporation of Delaware
No Drawing. Filed Oct. 12, 1966, Ser. No. 586,054
U.S. Cl. 252—33     10 Claims
Int. Cl. C10m 7/38, 5/22, 3/34

ABSTRACT OF THE DISCLOSURE

Production of a stable colloidal dispersion of a calcium compound in a liquid lubricating oil composition comprising providing a fluid suspension of calcium methoxide in isobutanol; carbonating said suspension by adding carbon dioxide thereto to produce a carbonated complex suspended in the isobutanol, said complex being characterized by substantial insolubility in methanol or isobutanol or mixtures thereof, or in mineral oil; adding said isobutanol suspension of the carbonated complex, under conditions of agitation, to an essentially single phase oily solution containing a lubricating oil, an oil soluble sulfonic acid dispersing agent or a calcium salt thereof having a pH not less than about 7, isobutanol and water; effecting hydrolysis whereby to produce a colloidal dispersion of the hydrolyzed calcium salts; heating to effect stripping of volatiles therefrom; and then filtering to produce a clear filtrate having a base number not less than about 150.

---

This invention relates to stable highly basic dispersions of calcium compounds in liquid lubricating oils which have especial utility as liquid lubricants in diesel and similar internal combustion engines.

It has, for a long period of time, been recognized as highly desirable to incorporate large quantities of calcium or other alkaline earth metal compounds into low cost lubricating oils of the type which contain relatively high contents of sulfur, said metal compounds being stably colloidally dispersed or suspended in said oils, said resulting stable dispersions being utilized particularly in diesel engines and other analogous environments. Various procedures have been evolved to effect this result, as illustrated in such U.S. patents as Nos. 2,585,520, 2,861,-951, 2,895,913, 2,920,105, 2,956,018, 2,982,726 3,083,-161, 3,085,064; and British Patent No. 942,067. The requirements to be satisfied by the finished lubricating oil compositions are well known to those skilled in the art, are detailed in the foregoing and other patents, and require no elaboration. Various of the procedures disclosed in certain of the foregoing patents have gone into commercial use, notably in lubricating oils in which the finished lubricating oil compositions have varying alkalinities as reflected by their so-called base numbers, namely, the number of milligrams of potassium hydroxide per gram of composition.

The invention of the present application is directed to the production of highly effective, improved lubricating oil compositions containing colloidally dispersed calcium compounds of various alkalinities, as, for example, with base numbers in the range of 150 and upwards, and it is especially valuable for the production of such compositions having base numbers in the range of 250 to 300 and even higher.

In general, the process of the present invention for the preparation of a stable dispersion of a calcium compound in a liquid lubricating oil composition comprises initially forming a fluid suspension in isobutanol of a calcium methoxide. This may be done in any one of a variety of ways as, for instance, by reacting metallic calcium with methanol and then adding isobutanol to the resulting calcium methoxide to form a fluid suspension of the calcium methoxide in the isobutanol. Alternatively, as disclosed in U.S. Patent No. 2,451,945 and in Chem. Abstracts, vol. 31, p. 4265 (1958), as well as in the aforesaid British Patent No. 942,067, the methanol can be reacted with calcium carbide, such as ordinary commercial calcium carbide, but preferably using a 10 to 20% excess of calcium carbide over stoichiometric proportions to produce the calcium methoxide. The latter may then be admixed with isobutanol to form a fluid suspension.

It is especially advantageous, however, to utilize, in the reaction with the calcium carbide, a mixture of methanol and isobutanol in which the molar ratio of the methanol to isobutanol is in the range of from about 2:1 to about 1:4, and, better still, in the range of about 1:1 to 1:2. The aforesaid alcohols are advantageously used in their essentially anhydrous form and the water content thereof is desirably 0.2% or less. The reaction mixture is held at elevated temperature, particularly at reflux temperature, until either the evolution of acetylene, is negligible or the concentration of calcium in the alcohol mixture remains substantially constant. At the conclusion of the reaction, a milky suspension is obtained. The calcium carbide reacts preferentially with the methanol to form calcium methoxide which is insoluble and is suspended in the isobutanol or mixture of methanol and isobutanol. In carrying out the reaction to produce the calcium methoxide, any methanol vapors which are released may be condensed and returned to the reaction vessel. Where calcium carbide is used, the acetylene gas which is evolved in the reaction with the methanol may, if desired be recovered.

The suspension of the calcium methoxide in the isobutanol may then be distilled, removing a methanol-rich fraction, whereby to reduce the methanol to isobutanol ratio of the mixture, and, at times, isobutanol may be added during the distillation, the distillation being carried out until the molar ratio of calcium to methanol approaches but does not become less than 1 mol of calcium to 1.8 mols of methanol. Instead of effecting such distillation at this stage of the process, it is more particularly desirable to carry out the distillation after the carbonation has begun, as described hereinafter.

The calcium concentration in the suspension is variable but, generally, it is adjusted by additions of isobutanol so that it will usually fall within the range of about 0.3 to 0.5 mol per 100 grams isobutanol. In general, the final reaction mixture should contain from 1 to 10 weight percent of calcium and especially from about 4.5 to 6 or 6.5 and, accordingly, additional isobutanol should be added to the reaction mixture, if necessary, to maintain the selected content of calcium. Upon completion of the reaction, the reaction mixture is allowed to settle and then the isobutanol suspension of the calcium methoxide is separated from the denser impurities.

The said anhydrous or substantially anhydrous suspension is then carbonated. While carbon dioxide can be added in its various physical states, it is advantageous from a practical handling and operating standpoint to add it to the reaction mixture as liquid carbon dioxide. The amount thereof is variable but it should be at least sufficient to react with all of the calcium to produce the complex and, in general, the amount added should be such that from about 1.3 to about 2.5 mols of carbon dioxide is reacted per mol of calcium. The carbon dioxide is added under conditions of agitation and at an elevated temperature, above the boiling point of methanol and most desirably in the range of about 150–205 degrees F. It is convenient to use α-naphtholbenzein as an indicator and to carry the carbonation to a point where a color change occurs in said indicator. The carbonated complex which is produced is in the form of a suspension in isobutanol. Whether a part of the isobutanol undergoes some reaction has not been ascertained. In any event, it is to be noted that the carbonated complex is substantially insoluble in methanol or isobutanol or mixtures of methanol and isobutanol. In this connection, it should be observed that this is in sharp contrast, for instance, to the situation in British Patent No. 942,067 which states that the carbonated complex is soluble in the alcohol or alcohols utilized. It may also be pointed out that the carbonated complex obtained pursuant to the present invention is characterized by insolubility, at a concentration of 0.2 gram, in 10 ml. of ligroin, benzene, mineral oil or isobutanol.

Instead of proceeding as described above to produce the carbonated complex, the introduction of carbon dioxide into the calcium methoxide suspension in the isobutanol can be instituted during the period of time that methanol is being distilled from said suspension and, when a boiling temperature, for instance, of the order of 215 to 217 degrees F., is reached, the mixture is allowed to cool, carbonation being continued to the desired extent. During this period, the aforesaid calcium concentration should be maintained by the addition of isobutanol. No catalyst is required to effect the carbonation reaction and, most desirably, none is utilized. It is stored, protected from moisture, until ready to be used further in the process.

The carbonation is desirably carried out to a point where the carbonated complex is characterized by reacting acid to α-naphtholbenzein indicator. Said indicator may, therefore, be used as a convenient guide for the discontinuance of the carbonation. While it is desirable, in the next step of the process, to utilize the carbonated complex which reacts acid to α-naphtholbenzein, carbonated complexes which give a basic reaction to α-naphtholbenzein can also be employed in the practice of the present invention. Thus, by way of example, the aforementioned acid-reacting complex can be boiled to expel some carbon dioxide whereby to render it basic to α-naphtholbenzein. Again, the carbonation reaction to produce the carbonated complex may be carried out to an extent somewhat short of producing a complex having an acid reaction to α-naphtholbenzein. It is particularly desirable, from the standpoint of uniformity and consistency of fully satisfactory results, to carry the carbonation to the extent of producing the acid-reacting complex and to use it as such, or to decarbonate it somewhat before using it in the further carrying out of the process.

The carbonated complex is slowly added, under conditions of agitation, and preferably at ambient temperatures, to an essentially single phase oily solution containing a lubricating oil, isobutanol, water, and an oil-soluble sulfonate dispersing agent which may be an alkylated or polyalkylated benzene sulfonic acid or a petroleum oil sulfonic acid, or a calcium salt thereof which may be substantially neutral or which may have a higher pH such as 9 to 10, while maintaining essentially the single phase character of said oily solution during said addition. The weight ratio of the lubricating oil, which is most desirably a mineral oil, to the said sulfonic acid or calcium salt thereof is variable, generally desirably being in the range of 1.2:1 to 1.8:1 but usually, for best results, should be approximately 1.5:1; the amount of water used should be that corresponding to a molar ratio of 2.5:1 to 4.5:1, most advantageously about 3:1, in relation to the amount of calcium carbonated intermediate. The amount of isobutanol present is variable within wide limits.

Hydrolysis is then allowed to take place under conditions of agitation whereby to effect a fine dispersion of the hydrolyzed calcium salts, for instance, in which the particles have diameters not exceeding about 0.25 micron, the mixture being converted during the hydrolysis procedure to a creamy suspension.

The creamy suspension is then heated to elevated temperatures, for instance, in the range of about 180–225 degrees F., to distill out or effect stripping of volatiles therefrom. Methanol is initially removed, followed by the removal of a water-isobutanol azeotrope, and finally by the removal of pure isobutanol. Thereupon, on filtering, there is obtained a clear, bright, oily fluid having a base number which, depending upon the conditions of the reaction and the proportions of materials utilized, may be of the order of 150 and, better still, 280 to 320. It is readily blended in all proportions with ordinary petroleum lubricating oils.

While various oil-soluble dispersing agents can be used in the overbasing procedure, as shown, for instance, in the various foregoing patents, it is especially advantageous to use oil-soluble sulfonic acids or oil-soluble calcium salts thereof, particularly advantageous examples thereof being a sulfonated bottoms fraction, said bottoms fraction, prior to sulfonation, being a fraction obtained as a byproduct from the production of dodecyl benzene and comprising a mixture of monoalkylbenzenes and di- or polyalkylbenzenes commonly called postdodecylbenzene; and petroleum oil sulfonic acids, especially those which have an average molecular weight in the range of about 400 to 600. Especially satisfactory are the calcium salts of the petroleum oil sulfonic acids prepared from neutral oil residues and comprising aromatic high-boiling hydrocarbons having an average molecular weight ranging from about 300 to about 500. The said residues are preferably sulfonated with concentrated or fuming sulfuric acid or other sulfonating agents, and then neutralized with lime. Alternatively, neutralization of free sulfonic acids may be effected with caustic soda to produce the sodium salts which are then treated with calcium chloride to effect a conversion of the sodium salts to the corresponding calcium salts. While it is particularly desired, in such cases, that the conversion to the calcium salts be substantially complete, excellent results have been obtained where the conversion is only of the order of 80%. After said conversion, the sulfonate layer is water-washed to remove or to reduce the content of sodium salts and other water-soluble materials detrimental to the optimum properties desired in the final product. The water-wash effects an improvement in the viscosity and filterability of the final product. One or more water-washes may be used as may be indicated. Techniques of producing calcium salts of petroleum sulfonic acid are, per se, known to the art and no novelty is claimed with respect thereto per se.

The lubricating oil carrier which is used in the overbasing step is most advantageously a nonvolatile material in which the sulfonic acid or calcium salt thereof used as the dispersing agent is soluble. Again, while various nonvolatile carriers can be used, many of which are disclosed in the foregoing patents, mineral lubricating oils are, from a practical, commercial standpoint, the most useful.

The following examples are illustrative of the practice of the present invention but they are not to be construed in any way as limitative of the full scope of the invention since various changes and modifications can be made in the light of the guiding principles and teachings disclosed herein.

Example 1

(a) A reaction vessel equipped with an agitator is initially purged with carbon dioxide gas and then charged with 83.1 pounds of methanol and 166.2 pounds of isobutanol, said alcohols containing a total of less than 0.2% by weight of water. Then 110 pounds of fresh, commercial unoiled grade calcium carbide (¼ ×D or ⅜ ×D) are charged to said reactor. The reactor, which is vented, is heated to 170 degrees F. and the agitator is started in operation. Acetylene gas is released almost immediately with heating. The reaction mixture refluxes initially at about 170 degrees F. but, as the reaction progresses and calcium methoxide forms, the mixture becomes thicker, more viscous, and does not reflux. The reaction mixture is maintained at about 170 degrees F. for a minimum of 14 hours in order to insure completion of the reaction. Methanol vapors are condensed back to the reactor to prevent their loss during flow of acetylene. Approximately 75% of the acetylene evolved is released within the first 6 hours of reaction.

(b) At the end of the reaction period, 574.5 pounds of isobutanol are added, thus making the calcium concentration of the mixture approximately 5%. The mixture is agitated and then allowed to settle while maintaining a temperature of approximately 150 degrees F. to 175 degrees F. Sufficient time is allowed to settle only the most dense solids which are the impurities. Too long a settlement time should be avoided since, otherwise, the calcium methoxide starts to sediment. The supernatant suspension is then removed and placed in the carbonation vessel. The remaining heavy solids are removed for discard or for recovery of calcium carbide. (In certain cases, the heavy solids may be allowed to remain in the reactor for several runs for more complete utilization of the calcium carbide before discarding.)

(c) The calcium methoxide suspension is reheated to about 150–160 degrees F. before carbonation. Liquid carbon dioxide is then added to the suspension while agitating vigorously. The temperature of the reaction mixture desirably is maintained close to 175 degrees F. using external cooling, if necessary, in order to remove the heat of reaction. The initial carbon dioxide addition purges dissolved acetylene from the suspension. Afterwards, the system is closed with a pressure release at a safe pressure for the vessel. The carbon dioxide is added at such a rate that no excess pressure develops, and preferably the total amount of carbon dioxide is added within a period of about 2 hours. The net amount of carbon dioxide used is 80–85 pounds. More may on occasion be required depending on the head space and on the excess needed to force completion of the reaction. The suspension after carbonation is tested for acidity, $\alpha$-naphtholbenzein indicator in anhydrous isopropanol turns yellow and pH paper will register about 7. If carbonation is incomplete, $\alpha$-naphtholbenzein indicator will turn green and pH paper will show above pH 9. Carbonation is carried out until the reaction mixture reacts acid to $\alpha$-naphtholbenzein indicator (yellow to said indicator). The carbonated complex is allowed to cool. It may then be stored preparatory to use in the further steps of the process. The storage vessel should be vented and protected by a drying agent in an adsorption tube. Generally, the carbonated complex can be safely stored for several weeks if kept free of moisture. The appearance of gel particles in it is an indication of deterioration and hydrolysis.

(d) An overbasing reaction vessel is charged with a mixture of 74.7 pounds (8.95 gallons) of water; 339 pounds (50.8 gallons) of isobutanol; and 305 pounds (39.7 gallons) of a mineral lubricating oil containing 40 to 41% by weight of calcium salts of petroleum sulfonic acids derived from aromatic high-boiling residues having a molecular weight in the range of 450–550, comprising a clear, filtered material having a pH of 9.2. Any water present in the materials used in the charge should be taken into account in connection with the amount of water specified and the amount of added water adjusted accordingly. The mixture is thoroughly agitated and maintained at about ambient temperature which, desirably, should not exceed about 85 degrees F.

(e) The carbonated complex is agitated to obtain substantial uniformity and maintained at about ambient temperature which, again, should not exceed about 85 degrees F. An amount of said carbonated complex, calculated and by analysis to contain 47.5 pounds of calcium, and which, if the carbonated complex solution contains 5% calcium, will amount to 114 gallons, is added gradually, over a period of about ½ hour and with thorough and continuous agitation, to the contents of the overbasing reaction vessel, while maintaining the mixture at ambient temperature not exceeding about 85 degrees F. The pH decreases gradually during the addition from about 8 to about 6.5, and evolution of carbon dioxide gas is particularly noticeable during the latter half of the addition period. Phase separation should not occur during the addition.

(f) Vigorous agitation is continued after completion of the addition. The mixture turns to a creamy suspension within about ½ hour at ambient temperature and within 5 minutes if heated. At least 15 minutes should be allowed between end of addition and actual removal of solvents. At 180–200 degrees F. the creamy mixture returns to one phase and remains so until completion of stripping. The major portion of volatiles should be evaporated within ½ hour of start of heating. The remaining volatiles are stripped, using heat and/or vacuum and/or $CO_2$ purge. At the flash point minimum of 360 degrees F., an ASTM water determination should be less than 0.4%.

(g) The product is filtered at or close to 300 degrees F. with a diatomaceous earth filter aid until a clear filtrate is obtained. The filtered product yields approximately 423 pounds of a clear, bright, oily liquid having a base number of about 300.

Example 2

(a) In a 2-liter reaction flask equipped with stirrer, thermometer and reflux condenser was placed 512 g. isobutanol, 352 g. calcium carbide, and 256 g. methanol. The contents of the flask were stirred and heated to reflux. The initial reflux temperature was 170 degrees F. This temperature gradually rose over a period of 4 hours to 185 degrees F. Refluxing was continued at 185 degrees F. until a total time of 15 hours had elapsed. Heating and stirring were discontinued, and the unreacted calcium carbide solids were allowed to settle for about 15 minutes. After this time, the supernatant milky white suspension was decanted into a 4-liter resin kettle, taking care not to decant any of the calcium carbide solids. The calcium carbide solids were rinsed with several 300 ml. portions of isobutanol and the rinsings were also added to the resin kettle. More isobutanol was added to the resin kettle to make a total of 1940 ml. added. The suspension was heated to 140 degrees F. and stirred vigorously.

(b) Gaseous carbon dioxide was added to the suspension at a rate of 1900 ml. per minute. The temperature rose to 203 degrees F. and then dropped. When the temperature was 170 degrees F., a small sample of solution was tested with $\alpha$-naphtholbenzein indicator and found to give an acid reaction. Carbon dioxide addition was stopped and the gray suspension was allowed to cool to room temperature. The composition of this suspension was found, on analysis, to be as follows: calcium content, 5.5 g. metal per 100 ml. solution; density, 0.93; water (Karl Fischer), 0.6%; carbon dioxide, 7.87%; and methanol, 8.8%.

(c) A sample of bottoms from a dodecyl benzene detergent alkylate production was blended with mineral oil and sulfonated with oleum. Excess sulfuric acid and sludge were separated from the sulfonic acid solution. The sulfonic acid solution was neutralized with agricultural lime and this solution had the following analysis: calcium sulfonate, 41.0%; oil, 58.2%; viscosity at 210 degrees F., 7.5 centipoises; and base number, 0.44.

(d) Into a 2-liter flask equipped with stirrer, thermometer, dropping funnel and distillation takeoff was placed 144 g. of the calcium sulfonate from detergent alkylate bottoms described above. Then 32 g. water and 200 ml. isobutanol were added and the contents of the flask were thoroughly agitated. The pH of this mixture was 7.6. In the dropping funnel was placed 410 ml. of the calcium suspension described above. The calcium suspension was added gradually to the contents of the flask within a period of 20 minutes. At the end of the addition, the pH of the flask contents was 6.8. The entire contents of the flask were heated rapidly with stirring until all of the volatile material distilled. The temperature of the residue in the flask at the end of distillation was about 310 degrees F. The remaining volatile vapors in the flask were blown out using a stream of $CO_2$ gas for about 15 minutes. At the end of this period there was no more odor of isobutanol. About 4% filter aid was added to the flask residue and the bright oily material was filtered. The filtered product had the following properties: base number, 297; and viscosity at 210 degrees F., 68 centipoises.

Example 3

(a) A 10-gallon electrically heated vessel equipped with an agitator, a condenser, and a partial cold-water cooling jacket was charged with 8.5 pounds calcium carbide (¼ × D), 6 pounds commercial anhydrous methanol, and 12 pounds commercial anhydrous isobutanol. The vessel was vented through a flame arrester to handle evolution of acetylene. The contents of the vessel were heated to 175 degrees F. and agitated. Heating was discontinued at the end of 9 hours. At the end of 22 hours, the temperature had fallen to 150 degrees F. The vessel and vent lines were purged with gaseous $CO_2$. The contents of the vessel were drained into an alternate vessel. Residual calcium carbide solids were cleaned out, and the milky white suspension was returned to the 10-gallon vessel after straining through a 200 mesh screen. The calcium carbide solids were rinsed with additional amounts of isobutanol, and the rinsings were transferred to the 10-gallon vessel. A total of 41 pounds of additional isobutanol was added to the 10-gallon vessel. The suspension in the vessel was then agitated and reheated to 160 degrees F.

(b) Liquid carbon dioxide under pressure was introduced into the vessel through a tube. Approximately 8 pounds of carbon dioxide was added in 50 minutes. A sample of the suspension was tested with α-naphtholbenzein indicator and it reacted acid to the indicator. A sample of this solution was analyzed. It had a calcium content of 3.8 per 100 ml. of suspension and a methanol content of 9.2% (weight/volume). The contents of the 10-gallon vessel were reheated to 175 degrees F. and blown 3 hours with gaseous $CO_2$. At the end of this time, the suspension was analyzed and had a calcium content of 7.5 g. per 100 ml. of solution and a methanol content of 11% (weight/volume).

(c) Into a 22-liter flask fitted with a large stopcock on the bottom was placed 1362 g. of a calcium petroleum sulfonate having the following analysis: pH 9, base number 20, percent calcium sulfonate 39.5, percent oil 59.5, molecular weight (of calcium sulfonate) 1004. Into the flask was also placed 322 ml. tap water and 2000 ml. commercial anhydrous isobutanol. The flask was fitted with a stirrer, the mixture was agitated, forming a slightly cloudy emulsion, pH 8.6, and 1330 ml. of the calcium suspension described above was added to the stirred mixture within 30 minutes via a Zero-Max peristaltic pump. At the end of the addition, a clear oily solution was obtained having a pH of 6.5. The solution was vigorously agitated at room temperature. After 15 minutes a milky emulsion formed. A 500 ml. aliquot of this emulsion was then removed, quickly stripped of volatile materials, and filtered to yield a sample of bright oily product. The remainder of the emulsion was stirred vigorously and its appearance changed very little. Similar aliquots were removed at 1 hour intervals until very little of this emulsion remained. The properties of the filtered, overbased sulfonate samples taken from this experiment are listed in the table below:

TABLE.—OVERBASED ALIQUOT SAMPLES

| Hours after emulsion formed | Filtration rate | Base no. mg. KOH/gm. | Viscosity SUS at 210° F. |
|---|---|---|---|
| 0 | Excellent | 285 | 285 |
| 1 | Good | 286 | 330 |
| 2 | do | 283 | 339 |
| 3 | do | 284 | 355 |
| 4 | Fair | 277 | 290 |
| 5 | do | 268 | 253 |

The filtration rate became less satisfactory and the Base No. and Viscosity decreased slightly with the passage of additional time.

What is claimed is:

1. A process for the preparation of a stable colloidal dispersion of a calcium compound in a liquid lubricating oil composition comprising:
    (a) providing a fluid suspension of calcium methoxide in isobutanol in which there is present from 1 to 10 weight percent of calcium,
    (b) carbonating said suspension by adding carbon dioxide thereto under conditions of agitation and at a temperature in the range of about 150–205 degrees F. whereby to produce a carbonated complex suspended in the isobutanol, said complex being characterized by substantial insolubility in methanol or isobutanol or mixtures thereof, or in mineral oil,
    (c) under conditions of agitation, adding said isobutanol suspension of said carbonated complex to an essentially single phase oily solution containing a lubricating oil, an oil-soluble dispersing agent in the form of a sulfonic acid, or calcium salt thereof having a pH not less than about 7, isobutanol and water, while maintaining essentially said single phase during said addition,
    (d) allowing hydrolysis to take place under conditions of agitation whereby to effect colloidal dispersion of the hydrolyzed calcium salts, said mixture being converted to a creamy suspension,
    (e) then heating said creamy suspension at an elevated temperature to effect stripping of volatiles therefrom,
    (f) and then filtering whereby to produce a clear filtrate having a base number not less than about 150.

2. The process of claim 1, in which the calcium salts of petroleum oil sulfonic acids are derived from aromatic high-boiling petroleum hydrocarbons having an average molecular weight in the range of about 300 to about 500.

3. The process of claim 1, in which the fluid suspension of calcium methoxide in isobutanol is formed by reacting methanol with a 10–20% excess over stoichiometric proportions of calcium carbide at an elevated temperature, under agitation, in an isobutanol medium.

4. The process of claim 1, in which the fluid suspension which is carbonated contains isobutanol and in which a minimum of 1.8 mols of methanol is present for each mol of calcium.

5. The process of claim 3, in which the isobutanol suspension of calcium methoxide, prior to carbonation, is separated from denser impurities which may be present therein.

6. The process of claim 3, in which the calcium salts of petroleum oil sulfonic acids are derived from aromatic high-boiling petroleum hydrocarbons having an average molecular weight in the range of about 300 to about 500.

7. The product produced by the process of claim 1.

8. A carbonated complex which is characterized by being insoluble in methanol, isobutanol, mixtures of methanol and isobutanol, and mineral oil, and resulting from carbonating a liquid suspension of calcium methoxide in isobutanol.

9. A carbonated complex according to claim 8, in which the carbonation is carried out to the extent that the carbonated complex reacts acid to α-naphtholbenzein.

10. A carbonated complex according to claim 9, in which the calcium content thereof is in the range of 1 to 10%.

References Cited

UNITED STATES PATENTS

| | | | |
|---|---|---|---|
| 2,451,945 | 10/1948 | Hanford | 260—632 |
| 2,585,520 | 2/1952 | Van Ess et al. | 252—33 |
| 2,895,913 | 7/1959 | Carlyle et al. | 252—33 |
| 2,956,018 | 10/1960 | Carlyle et al. | 252—18 |

PATRICK P. GARVIN, *Primary Examiner.*

U.S. Cl. X.R.

252—18.